(12) United States Patent  
Cazin et al.

(10) Patent No.: US 12,055,060 B2  
(45) Date of Patent: Aug. 6, 2024

(54) TURBINE RING ASSEMBLY

(71) Applicant: SAFRAN AIRCRAFT ENGINES, Paris (FR)

(72) Inventors: Clément Emile André Cazin, Moissy-Cramayel (FR); Pascal Cédric Tabarin, Moissy-Cramayel (FR); Sébastien Serge Francis Congratel, Moissy-Cramayel (FR); Nicolas Paul Tableau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/251,930

(22) PCT Filed: Nov. 4, 2021

(86) PCT No.: PCT/FR2021/051943  
§ 371 (c)(1),  
(2) Date: May 5, 2023

(87) PCT Pub. No.: WO2022/096828  
PCT Pub. Date: May 12, 2022

(65) Prior Publication Data  
US 2024/0003267 A1    Jan. 4, 2024

(30) Foreign Application Priority Data

Nov. 5, 2020 (FR) ........................ 2011386

(51) Int. Cl.  
*F01D 25/24* (2006.01)  
*F01D 9/04* (2006.01)

(52) U.S. Cl.  
CPC ............ *F01D 25/246* (2013.01); *F01D 9/04* (2013.01); *F05D 2240/14* (2013.01); *F05D 2260/30* (2013.01); *F05D 2260/96* (2013.01)

(58) Field of Classification Search  
CPC ....... F01D 25/246; F01D 9/04; F05D 2240/14  
See application file for complete search history.

(56) References Cited

U.S. PATENT DOCUMENTS

| 4,303,371 | A  | * | 12/1981 | Eckert | ..................... F01D 25/14 |
|-----------|----|---|---------|--------|------------------------------|
|           |    |   |         |        | 415/178                      |
| 6,997,673 | B2 | * | 2/2006  | Morris | ..................... F01D 9/042 |
|           |    |   |         |        | 415/173.1                    |

FOREIGN PATENT DOCUMENTS

| EP | 1593813 A1 | 11/2005 |
|----|------------|---------|
| EP | 3061924 A1 | 8/2016  |

(Continued)

OTHER PUBLICATIONS

French Search Report issued in French Application No. 2011386, mailed on Jun. 23, 2021.

(Continued)

*Primary Examiner* — Michael L Sehn  
(74) *Attorney, Agent, or Firm* — Bookoff McAndrews, PLLC

(57) ABSTRACT

A turbine ring assembly extending around a longitudinal axis and comprises:
- a plurality of ring angular sectors made of CMC material circumferentially arranged in such a way as to form a turbine ring, each sector comprising a base from which an upstream leg and a downstream leg extend radially,
- a ring support structure comprising:
- a spacer extending around the sectors and comprising a downstream flange in such a way that the downstream leg of each sector is held against the downstream flange,
- a upstream force-absorbing plate extending circumferentially around the longitudinal axis in such a way as to be in contact with the upstream leg of each sector and (Continued)

fixed to an upstream area of the spacer which extends in extension of the upstream leg.

15 Claims, 3 Drawing Sheets

(56) References Cited

FOREIGN PATENT DOCUMENTS

| | | |
|---|---|---|
| FR | 3055146 A1 | 2/2018 |
| FR | 3056636 A1 | 3/2018 |
| FR | 3076578 A1 | 7/2019 |

OTHER PUBLICATIONS

International Search Report issued in International Application No. PCT/FR2021/051943, mailed on Mar. 17, 2022.

* cited by examiner

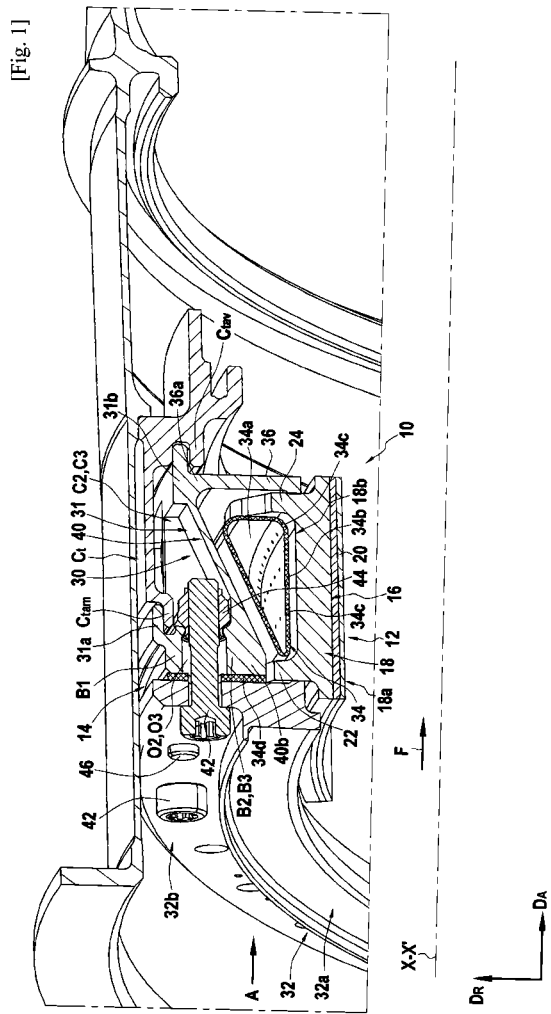
[Fig. 1]

[Fig. 2]
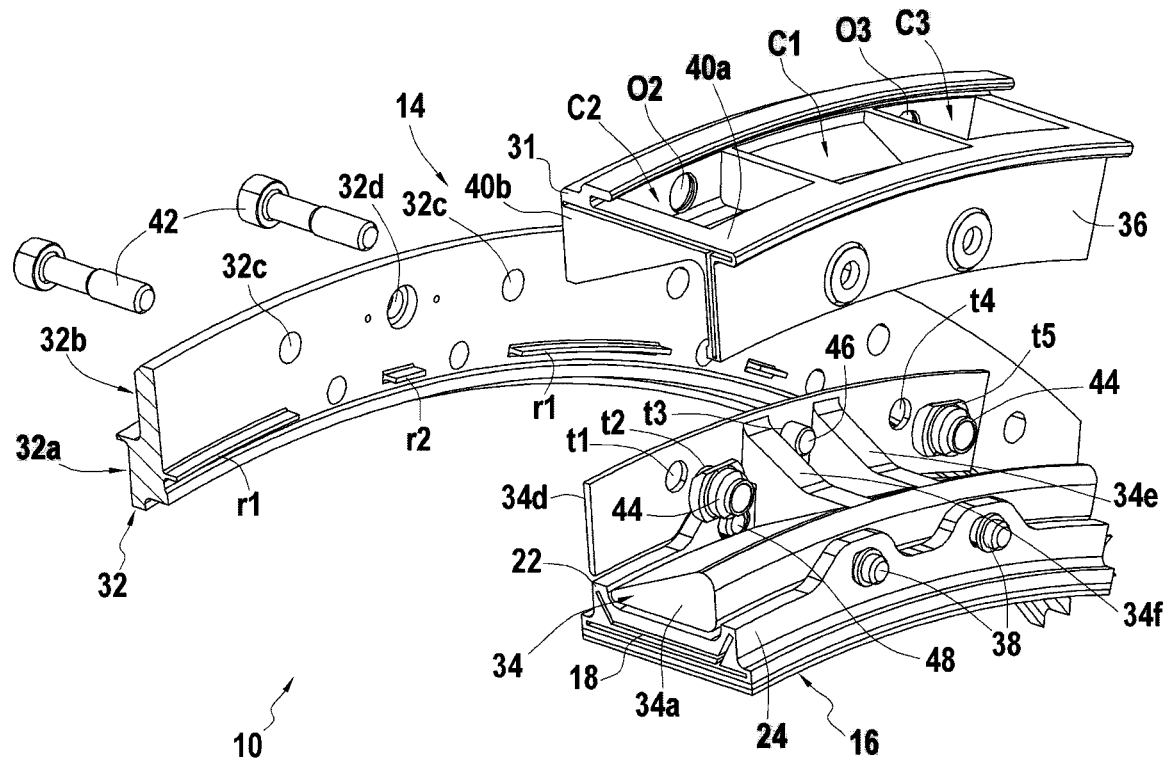
[Fig. 3]
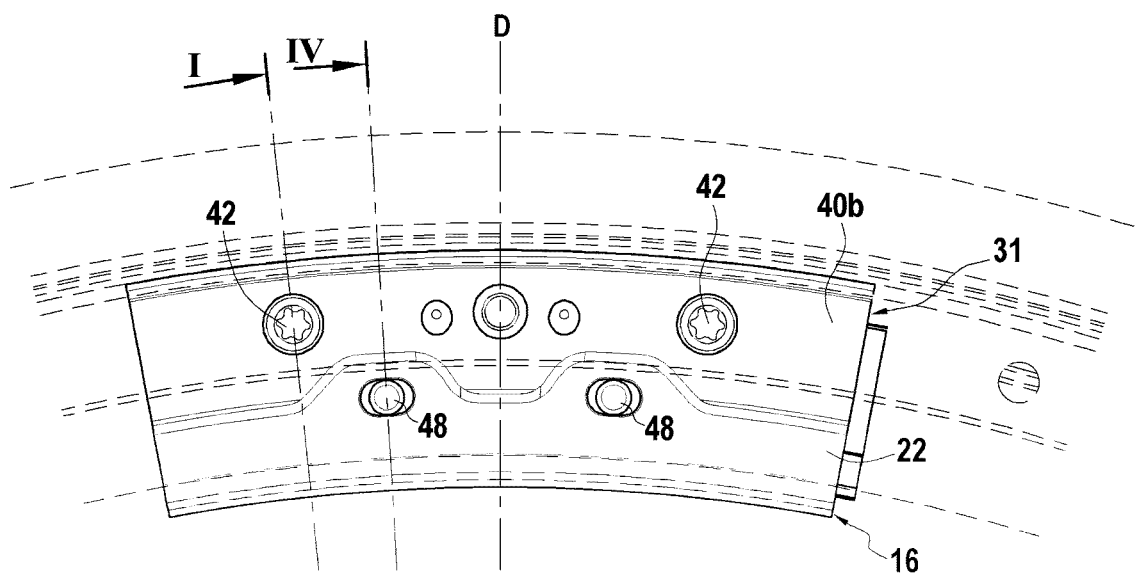

[Fig. 4]
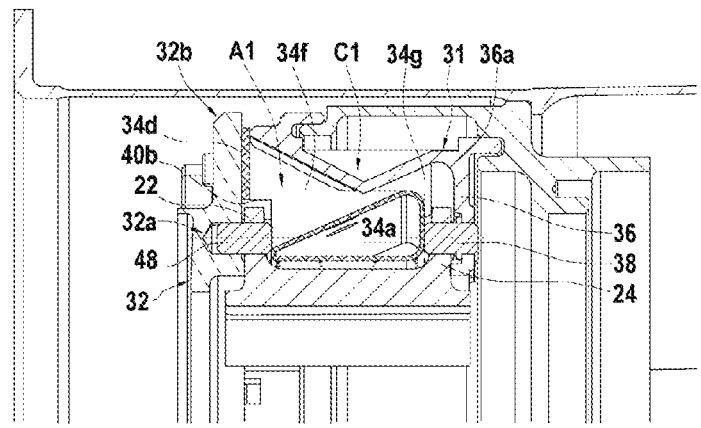
[Fig. 5]
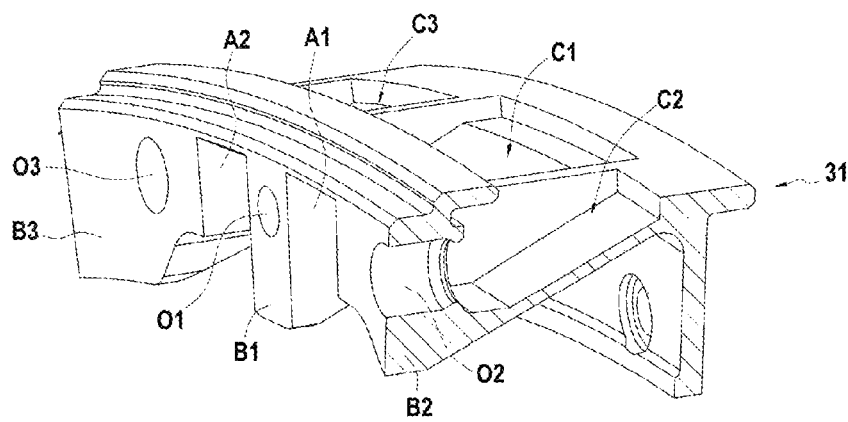

TURBINE RING ASSEMBLY

CROSS-REFERENCE TO RELATED APPLICATIONS

This is a National Stage Application under 35 U.S.C. § 371 of International Application No. PCT/FR2021/051943, filed Nov. 4, 2021, now published as WO 2022/096828 A2, which claims priority to French Patent Application No. 20 11386, filed on Nov. 5, 2020.

TECHNICAL FIELD

The present disclosure relates to a turbine ring assembly for a turbomachine, wherein the turbine ring assembly comprises a plurality of angular sectors placed circumferentially end to end, in order to form a turbine ring made of ceramic matrix composite material.

The invention applies in particular to aeronautical gas turbine engines, or even to other turbomachines such as industrial turbines.

PRIOR ART

In aeronautical gas turbine engines, it is known to produce angular sectors of a turbine ring assembly made of ceramic matrix composite material (CMC) instead of a metal material, in particular a metal alloy. This is made possible by the fact that CMC material has mechanical properties which make it more suitable for forming structural pieces subjected to high temperatures than metal materials which require particularly high cooling air flow rates. The use of a CMC material thus makes it possible to reduce the flow rate of cooling air which is generally taken from the engine, and therefore to improve the performance of the turbomachine.

Turbine ring assemblies for turbomachines, using CMC material, are known in particular from patents FR3056636, FR3055146 and FR3076578.

Although these turbine ring assemblies are satisfactory, there is nevertheless a need to improve their structure.

DISCLOSURE OF THE INVENTION

An object of the invention is therefore a turbine ring assembly extending around a longitudinal axis along which a fluid is intended to flow from upstream to downstream, the turbine ring assembly comprising:

a plurality of ring angular sectors made of ceramic matrix composite material arranged circumferentially in such a way as to form a turbine ring, each ring angular sector comprising a base from which an upstream leg and a downstream leg extend radially, in extension of the longitudinal axis, axially spaced apart from one another, a ring support structure which comprises: a spacer extending circumferentially around the plurality of ring angular sectors and comprising one or more downstream flanges in such a way that the downstream leg of each ring angular sector is held against the downstream flange or one of the downstream flanges of the spacer, an upstream force-absorbing plate extending circumferentially around the longitudinal axis and radially relative to this axis in such a way as to be simultaneously, on the one hand, in abutment against the upstream leg of each ring angular sector and, on the other hand, attached to an upstream area of the spacer which is arranged radially in line with the upstream leg of each ring angular sector, externally to the upstream leg relative to the longitudinal axis, an air diffuser arranged between the spacer and each ring angular sector, the air diffuser comprising an upstream wall attached between the upstream force-absorbing plate and the upstream area of the spacer.

This configuration of turbine ring assembly can control the axial positioning of the plurality of ring angular sectors and, in particular, improve the recovery of axial dimension tolerances of the angular sectors. The turbine ring assembly is held directly on the turbine housing by means of the above-mentioned ring support structure, for example, via upstream and downstream hooks. The novel turbine ring assembly configuration also comprises a number of pieces that are reduced compared to the prior art (in particular a single force-absorbing upstream plate), which reduces the number of operations for installing this assembly and therefore facilitates its installation. The weight of the assembly is likewise reduced. Furthermore, the air diffuser of the turbine ring assembly is held in position axially by its upstream wall arranged (pinched) between the upstream force-absorbing plate and the upstream area of the spacer.

According to other possible features:

a plurality of flanging members are distributed circumferentially between the upstream force-absorbing plate and the upstream area of the spacer, in such a way as to produce a pre-clamping of the upstream force-absorbing plate over the upstream area of the spacer;

upstream holding members connect the upstream leg of each ring angular sector and the upstream force-absorbing plate;

downstream holding members connect the downstream leg of each ring angular sector and the downstream flange or flanges of the spacer;

the upstream force-absorbing plate comprises a first plate part which is radially internal and a second plate part which is radially external and extends radially in extension of the first plate part relative to the longitudinal axis, the first plate part being in contact with the upstream leg of each ring angular sector and axially thickened with respect to the second plate part which is attached to the upstream area of the spacer.

the second plate part is axially thickened with respect to the or each downstream flange of the spacer;

the spacer comprises an upstream hook and a downstream hook axially spaced apart from one another and each having the same orientation directed upstream or downstream, each hook being intended to cooperate with a corresponding hook of opposite orientation of a turbine casing, for hooking the spacer thereto;

the upstream and downstream hooks of the spacer are oriented downstream;

the spacer comprises a downstream area comprising the downstream flange or flanges and which is cantilevered radially inwards in the direction of the longitudinal axis from the downstream hook of the spacer;

the downstream flange or flanges of the spacer extend radially from a base of the downstream flange or flanges towards the plurality of ring angular sectors, and the spacer comprises a part which extends axially from the base of the downstream flange or flanges to the upstream area of the spacer with a radial dimension which increases in the direction towards this upstream area, in such a way as to give this part of the spacer a generally triangular shape in axial cross-section.

the spacer part of generally triangular shape comprises a plurality of successive segments arranged circumferentially adjacent to one another;

the air diffuser comprises a wall arranged facing the angular sector (to be cooled) and pierced by a plurality of through-holes for the passage of cooling air and for the distribution of a cooling air flow (radially, in particular directed from the outside to the inside of the ring assembly) on the facing ring angular sector; the air diffuser may comprise, arranged radially around the wall pierced by a plurality of through-holes, a cavity supplied with cooling air; the wall pierced by a plurality of through-holes is arranged substantially radially and extends circumferentially around and facing an outer face of the angular sector facing and parallel to this outer face in order that the cooling air flow exits from the through-holes opening directly on this face;

the wall of the diffuser pierced by a plurality of through-holes is arranged at a distance sufficiently close to the facing ring angular sector, in particular its outer face, in such a way as to minimise the temperature gradient over the facing angular sector;

the air diffuser is arranged in an inner space which is delimited, on the one hand, by the spacer and, on the other hand, by each ring angular sector, the air diffuser having a general shape, in particular triangular, suitable for being introduced into the inner space.

Another object of the invention is a turbomachine comprising a turbine ring assembly as briefly disclosed above.

BRIEF DESCRIPTION OF THE FIGURES

Other features and advantages of the subject matter of the present invention will emerge from the following description of embodiments, provided by way of non-limiting examples, with reference to the accompanying figures.

FIG. 1 is a perspective general schematic partial view along an axial section of a turbine ring assembly according to an embodiment of the invention;

FIG. 2 is a perspective schematic expanded view from the rear (downstream) of the turbine ring assembly of FIG. 1;

FIG. 3 is a schematic partial view in a transverse plane of the face upstream of the turbine ring assembly of FIG. 1 without the force-absorbing plate (view along A of FIG. 1);

FIG. 4 is a schematic view in axial section of the turbine ring assembly of FIG. 1 along the sectional plane IV of FIG. 3;

FIG. 5 is a prospective schematic view from the front (upstream) of the spacer angular sector of the turbine ring assembly of FIG. 1.

DETAILED DESCRIPTION

As shown in FIGS. 1 to 5 and designated by the general reference sign 10, a turbine ring assembly for a turbomachine (in an aircraft) according to an embodiment of the invention will now be described. This assembly 10 extends around a longitudinal axis X-X' along which a gaseous fluid is intended to flow to the inside of the turbine ring assembly.

The terms "upstream" and "downstream" are used here with reference to the flow direction of the gas flow along the axis X-X', to the inside of the turbine ring assembly, represented by the arrow F in FIG. 1.

In FIG. 1, the arrow $D_A$ indicates the axial direction of the turbine ring assembly 10, while the arrow DR indicates its radial direction. In order to simplify the representation, FIGS. 1 to 5 are partial views of this assembly which, in reality, is annular.

This assembly 10 comprises, in particular, a turbine ring 12 made of ceramic matrix composite material (CMC), centred on the longitudinal axis X-X' and a metal ring support structure 14 radially surrounding the turbine ring 12 and extending circumferentially around this ring.

The turbine ring 12 surrounds a turbine blade assembly that is known per se and not shown in the figures.

In the remainder of the description, the turbine described here is a high-pressure turbine. However, the invention can likewise apply to a low-pressure turbine.

The turbine ring 12 is formed of a plurality of ring angular sectors 16, which are arranged end to end circumferentially, in order together to form a complete ring. The sectors are, in particular, connected to one another mechanically by connection elements such as axial pins which will be described below.

Each ring angular sector 16 has an axial cross-section (FIG. 1) substantially in the shape of an inverted Greek letter Pi (or H), with a base 18, having an inner face 18a oriented towards the axis X-X', which defines an angular portion of the inner face of the turbine ring 12 and an outer face 18b, opposite the inner face 18a, orientated away from the axis X-X' and which defines an angular portion of the outer face of the ring turbine 12. The inner face 18a is, for example, provided with a layer of abradable coating 20 which also acts as a thermal and environmental barrier.

An upstream leg 22 and a downstream leg 24 extend radially from each angular portion of the outer face 18b of each angular turbine ring sector in extension of the axis X-X', in other words towards the outside of the turbine ring 12. These legs are axially spaced apart from one another in the direction $D_A$ by a distance which corresponds to almost the entire width (axial dimension along the axis X-X') of the ring angular sector. Furthermore, each of the two legs 22, 24 of each ring angular sector 16 extends circumferentially (in a transverse plane perpendicular to the axis X-X') over the entire length (arc) of the angular sector concerned with a radial or height extension (in direction DR) which varies according to the length as a function of the presence of assembly member or members axially arranged relative to the ring angular sector concerned.

The ring support structure 14 is produced by the assembly of a plurality of pieces that are distinct (i.e. independent) from one another.

More particularly, as shown in FIGS. 1 and 2, the ring support structure 14 comprises a spacer 30, an upstream force-absorbing plate 32 and an air diffuser 34.

The spacer 30 can be produced by assembling a plurality of spacer angular sectors 31 placed end to end circumferentially, as in the present embodiment (this configuration proves relatively easy to assemble), or be formed of a single rotationally symmetric piece (in other words extending over 360°).

In general, the spacer 30 extends circumferentially around the plurality of ring angular sectors 16 and comprises one or more downstream flanges in such a way that the downstream leg 24 of each ring angular sector 16 is held against the downstream flange or one of the downstream flanges 36 of the spacer. In the present embodiment, each spacer angular sector 31 comprises a downstream flange 36 which extends radially towards the facing ring angular sector 16 (in the direction of the axis X-X') and which extends parallel to the downstream leg 24, against the latter. The downstream leg 24 is held against the downstream flange 36 by means of holding members such as downstream axial pins 38 (FIGS. 2 and 4) which are arranged in line with local portions of the downstream leg 24 which have an increased radial extension (FIG. 2), for example in the manner of slots (this cut-out profile, i.e. not rectilinear, of the upper edge of the downstream leg 24 enables the weight of the piece to be limited). Here, the downstream flange 36 has the same radial extension along its length (in a circular arc) in order to have continuous contact with the ring, with the aim of maintaining a radial sealing. The downstream flange 36 is relatively thin compared with the rest of the spacer structure and thus has a certain flexibility which enables it to absorb certain forces transmitted to the spacer. In order to hold each downstream leg 24 against each downstream flange 36, there are, for example, two axial pins 38 (FIG. 2) and the set of axial pins is regularly distributed around the longitudinal axis X-X' for all the angular ring and spacer sectors assembled end to end circumferentially. The number of axial pins per downstream leg-downstream flange pair can of course vary.

As shown in FIGS. 1, 2 and 4, the downstream flange 36 of each spacer sector 31 extends radially from a base 36a towards the facing ring angular sector 16. The spacer sector 31 comprises a part 40 which extends axially (in direction $D_A$), from a downstream end 40a defining a downstream area of the spacer, located at the base 36a of the downstream flange 36, towards its opposite upstream end 40b defining the upstream area of the spacer, increasing its radial dimension. In general, the downstream end 40a of the spacer which comprises the downstream flange 36 is cantilevered radially inwards (towards the axis X-X') from the base 36a.

Here, the part 40 has an axial cross-section with a general triangular shape. The upstream end 40b extends radially towards the upstream leg 22 of the ring angular sector 16 (the upstream end 40b is arranged in line with the upstream leg 22 and outside of the latter relative to axis X-X') and here has, in cross-section (face view of FIG. 3), a free lower edge that is cut in such a way as to nest with the locally slotted profile of the free upper edge of the upstream leg 22.

As shown in FIG. 2, the part 40 of the spacer sector 31 comprises a plurality of segments arranged successively next to one another circumferentially which define different adjacent hollowed out functional areas (in order to lighten the structure) of the spacer forming partially closed compartments, for example three compartments C1, C2, C3 (the number of compartments could however differ in another embodiment), shown in FIGS. 1, 2, 4 and 5.

The compartments C2 and C3 are symmetric with one another relative to the central compartment C1 and the axial section of FIG. 1 shows the two compartments C2-3. The central compartment C1 is visible in FIGS. 2, 4 and 5.

The central compartment C1 has, in a rear perspective (downstream) from above (FIG. 2) a hollow formed by two walls inclined towards one another and, in a front perspective (FIG. 5), two axial recesses A1, A2 (A1 is visible in FIG. 4) on either side of a central block B1 (visible in FIG. 1) pierced by an orifice O1 on the front face (visible in FIG. 5), the elements A1, A2 and B1 being arranged below the hollow of FIG. 2 (FIG. 4 for the recess A1).

The compartments C2 and C3 are open from above, as shown in FIGS. 2 and 5, and each have a substantially triangular-shaped in axial cross-section (FIG. 1). According to the front (upstream) perspective view of FIG. 5, the compartments C2 and C3 comprise respectively blocks B2 and B3, each pierced by an orifice O2, O3 on the front face.

It will noted that the compartmentalised configuration into compartments of the spacer sector 31 may vary without departing from the scope of the present invention.

Each spacer sector 31 (FIG. 1) may comprise, on the one hand, an upstream hook 31a which is intended to engage in a corresponding upstream hook Ctam of a turbine casing Ct and, on the other hand, a downstream hook 31b which is intended to engage in a corresponding downstream hook Ctav of the turbine casing in order to enable the assembling of the ring support structure 14 directly on the turbine casing and its retention in position.

The two upstream and downstream hooks of the turbine casing are, for example, oriented upstream and the two upstream and downstream hooks of each spacer sector 31 are oriented in the opposite direction, in other words downstream. This arrangement facilitates the mounting of the spacer directly on the turbine casing and does not require any ring support casing for mounting of the assembly on the turbine casing. It will be noted that the two hooks are arranged following distinct radii relative to the longitudinal axis X-X'. The downstream end 40a of the spacer which comprises the downstream flange 36 is, more particularly, cantilevered radially inwards (towards the axis X-X') from the downstream hook 31b.

In general, the air diffuser 34 shown in FIGS. 1, 2 and 4 extends circumferentially around the longitudinal axis X-X' over 360° and is sectorised in such a way as to correspond to each angular ring-spacer assembly sector. The air diffuser 34 is intended to diffuse cooling air over the plurality of ring angular sectors 16 and, more particularly, over the outer face 18b of each of them (FIG. 1). The air diffuser 34 is arranged between each spacer angular sector 31 and each ring angular sector 16. More particularly, it is arranged facing each ring angular sector and radially outside thereof relative to the axis X-X'.

In the described embodiment, the air diffuser 34 is arranged in an inner space which is delimited, on the one hand, by each spacer angular sector, in particular by the downstream flange 36 and the spacer part 40 and, on the other hand, by each ring angular sector 16. As shown in FIGS. 1, 2 and 4, the air diffuser 34 thus has a general shape suitable for being introduced into the above-mentioned inner space, for example a general triangular shape. It will be noted that the respective shapes of the spacer part 40 with the downstream flange 36 and of the diffuser body can vary together in such a way as to remain adapted to one another.

The air diffuser 34 comprises a cavity 34a positioned around the base 18 of each ring angular sector 16 which is fed with cooling air taken, for example, from a compressor stage of the turbomachine which comprises the turbine ring assembly 10. The cavity 34a is delimited by a wall 34b of the diffuser body which is oriented facing the outer face 18b of the ring angular sector, substantially parallel thereto, and which is perforated with a multitude of through-holes 34c which open on the outer face 18b in order to distribute the cooling air thereover (FIG. 1). The through-holes 34c of the air diffuser are configured sufficiently close to the facing parallel outer face 18b to be cooled in order to minimise the temperature gradients on the ring angular sector due to this impact of localised air flow in a radial direction. Too large a distance between the holes 34c and the facing outer face 18b would give rise to a more diffuse air flow and therefore have less impact on the outer face 18b, thus generating larger temperature gradients and therefore a reduced efficiency.

As shown in FIG. 2, the air diffuser 34 also comprises an upstream wall 34d connected to the diffuser body which closes the cavity 34a by means of two parallel structural arms 34e and 34f (the arm 34f is visible in the background of FIG. 4) circumferentially spaced apart from one another and extending axially. These two arms 34e and 34f are intended to fit respectively into the axial recesses A2 and A1 of the spacer sector of FIG. 5. The upstream wall 34d forms an upstream flange of the diffuser and is pierced by a plurality of holes t1-t5 passing through its thickness (FIG. 2) in order to receive various assembly members. This upstream flange 34d is intended to come into abutment against the end face of the end or upstream end 40b of each spacer sector 31.

As already mentioned, the ring support structure 14 comprises the upstream force-absorbing plate 32 which has a rotationally symmetric shape (360°) around the longitudinal axis X-X', which is partially shown in FIG. 2. In general, the upstream plate 32, that is produced in a single piece, is arranged in such a way as to be simultaneously, on the one hand, in direct contact with the upstream leg 22 (and in abutment thereon) of each ring angular sector 16 and, on the other hand, attached to the upstream end 40b of each spacer angular sector (this end 40b is located radially externally to the upstream leg 22 relative to the longitudinal axis X-X' and in the radial extension thereof). This arrangement makes it possible to hold the plurality of ring angular sectors 16 in the axial position (in direction $D_A$).

More particularly, the upstream force-absorbing plate 32 extends radially relative to the longitudinal axis X-X' in the form of two plate parts (forming a single same piece) which extend away from this axis: a first plate part 32a that is radially inner (relative to the axis X-X') followed by a second plate part 32b that is radially outer (relative to the axis X-X'). The first, inner plate part 32a is axially thickened (in the direction $D_A$) relative to the second, outer plate part 32b arranged facing the upstream end 40b of the spacer. It will be noted that the second plate part 32b is axially thickened relative to the relatively flexible downstream flange 36 of the spacer, thus providing, in a general manner, the assembly of the upstream force-absorbing plate 32 with a relatively high rigidity.

More particularly, the upstream wall 34d of the air diffuser 34 is interposed between the upstream plate 32 and the spacer 30 and attached between these two pieces, thus axially blocking the diffuser. More particularly, the upstream wall 34d is pinched between, on the one hand, the second plate part 32b and an upper portion of the first plate part 32a and, on the other hand, the upstream end 40b of the spacer. The upstream wall 34d is likewise arranged in the radial extension of the upstream leg 22, on the outside thereof relative to the axis X-X'.

As shown in FIGS. 1 and 4, in the assembly of the ring support structure 14, the first plate part 32a is arranged in such a way as to be in contact with the upstream leg 22 (and also partly with a lower portion of the upstream wall 34d of the diffuser). The second plate part 32b is, itself, arranged in such a way as to be in contact with the upstream wall 34d of the diffuser and attached, with the latter, to the upstream spacer end 40b.

A plurality of flanging/connecting members are distributed circumferentially in such a way as to connect the second plate part 32b (circumferentially pierced by a plurality of through-holes 32c), the upstream wall 34d of the diffuser and the upstream spacer end 40b, in such a way as to produce a pre-clamping of the upstream plate on the spacer. These members referenced 42 in FIGS. 1, 2 and 4 are, for example, clamping screws 42 provided with nuts 44 and are successively engaged in the through-holes 32c, in the orifices t2 and t5 of the upstream flange 34d of the diffuser and in the orifices O2 and O3 of the spacer sector 31, in order to open into the cavities C2 and C3.

A plurality of assembly members produced in the form of axial pins 46 (FIG. 1) is engaged successively through a plurality of other through-holes 32d of the second plate part 32b (FIG. 1), through the holes t3 of the upstream flange 34d of the diffuser (FIG. 2) and through the orifices O1 of the spacer angular sector which open into the bottom of a housing (FIG. 5). These pins 46 serve to precisely position the diffuser 34 tangentially relative to the upstream plate 32 in order that the latter is better positioned facing the ring angular sectors and facing the two bores arranged on either side of the hole 32d (FIG. 2). Here, these two bores are calibrated bores for supplying air from the diffuser.

It will be noted that the upstream force-absorbing plate 32 comprises, on its inner face (FIG. 2) oriented opposite the upstream flange 34d of the diffuser and the upstream leg 22 of each ring angular sector, disjoint ledges or ribs r1, r2 which extend over t arc portions (angular sectors) and which are intended to be inserted between the lower edge of the upstream flange 34d and the upper edge of the upstream leg 22. These ledges complement the action of the pin 46 by radially holding the diffuser so that the latter is at an optimum distance from the ring angular sector concerned and does not come into contact with it.

As illustrated in FIGS. 2 and 4, upstream holding members each connect the upstream leg 22 of each ring angular sector 16 and the upstream force-absorbing plate 32 and engage, at one end, in a housing (blind hole) of the first plate part 32a (FIG. 4). These members are connection members 48 produced, for example, in the form of axial pins 38.

It will be noted that the thinned downstream configuration of the spacer sectors compared with the spacer part 40 for which the thickness increases downstream (the spacer part 40 can adopt a different configuration without this affecting the principle described here), makes it possible to limit the transmission, to the ring angular sectors 16, of the forces exerted on the upstream plate 32 by the high-pressure distributor (not shown) in contact with this plate.

The downstream thinning of the spacer sectors is produced here in the form of a thinned leg 36 which is thus provided with a certain axial flexibility (elasticity) relative to the rest of the spacer sector.

Furthermore, the upstream force-absorbing plate 32 has a high stiffness/rigidity due, on the one hand, to the greater thickness of its first plate part 32a in contact with the ring angular sectors 16, compared to its second plate part 32b and, on the other hand, due to the larger rigidity of the upstream plate 32, in particular of its second plate part 32b, relative to the downstream area of the spacer sectors.

Hence, the forces exerted on the upstream plate 32 by the high-pressure distributor are mainly absorbed by this piece and their transmission to the ring angular sectors 16 is limited.

The upstream force-absorbing plate 32 is formed as a single rotationally symmetric piece, which makes it possible to improve the management of axial leaks between the circular cavity situated above the high-pressure distributor and the cavity of the ring. Moreover, this monobloc plate likewise ensures better positioning of the ring angular sectors than a sectorised plate.

In addition, the axial holding in position of the ring angular sectors is ensured by the pre-clamping introduced by the flanging/connection members distributed circumferentially between the upstream force-absorbing plate 32 (in particular the second plate part 32b) and the upstream end 40b of the spacer.

It will be noted that there is no other piece in the assembly of the ring support structure other than the upstream plate 32, the diffuser 34 and the spacer 30, in particular in the upstream area of this assembly where the plate is arranged directly and simultaneously against the diffuser (itself in abutment against the upstream end 40b of the spacer) and the upstream leg of the ring sectors.

Although the present description refers to specific exemplary embodiments, modifications can be applied to these examples without going beyond the general scope of the invention as defined by the claims. In addition, the individual features of different embodiments illustrated or mentioned can be combined in additional embodiments. Consequently, the description and the drawings should be considered as illustrating rather than limiting.

The invention claimed is:

1. A turbine ring assembly extending around a longitudinal axis along which a fluid is intended to flow, from upstream to downstream, the turbine ring assembly comprising:
   a plurality of ring angular sectors made of ceramic matrix composite material arranged circumferentially in such a way as to form a turbine ring, each ring angular sector comprising a base, from which an upstream leg and a downstream leg extend radially, in extension of the longitudinal axis, axially spaced apart from one another,
   a ring support structure which comprises:
   a spacer extending circumferentially around the plurality of ring angular sectors and comprising one or more downstream flanges in such a way that the downstream leg of each ring angular sector is held against the one or more downstream flanges of the spacer,
   an upstream force-absorbing plate extending circumferentially around the longitudinal axis and radially relative to this axis, in such a way as to be simultaneously, on the one hand, in abutment against the upstream leg of each ring angular sector and, on the other hand, attached to an upstream end of the spacer which is arranged radially in line with the upstream leg of each ring angular sector, externally to the upstream leg relative to the longitudinal axis,
   an air diffuser arranged between the spacer and each ring angular sector, the air diffuser comprising an upstream wall attached between the upstream force-absorbing plate and the upstream end of the spacer.

2. The turbine ring assembly according to claim 1, wherein a plurality of flanging members are distributed circumferentially between the upstream force-absorbing plate and the upstream end of the spacer in such a way as to produce a pre-clamping of the upstream force-absorbing plate on the upstream end of the spacer.

3. The turbine ring assembly according to claim 1, wherein upstream holding members connect the upstream leg of each ring angular sector and the upstream force-absorbing plate.

4. The turbine ring assembly according to claim 1, wherein downstream holding members connect the downstream leg of each ring angular sector and the one or more downstream flanges of the spacer.

5. The turbine ring assembly according to claim 1, wherein the upstream force-absorbing plate comprises a first plate part which is radially inner and a second plate part which is radially outer and extends radially in extension of the first plate part relative to the longitudinal axis, the first plate part being in contact with the upstream leg of each ring angular sector and axially thickened with respect to the second plate part which is attached to the upstream end of the spacer.

6. The turbine ring assembly according to claim 5, wherein the second plate part is axially thickened with respect to the one or more downstream flanges of the spacer.

7. The turbine ring assembly according to claim 1, wherein the spacer comprises an upstream hook and a downstream hook axially spaced apart from one another and each having the same orientation directed upstream or downstream, each hook being intended to cooperate with a corresponding hook of opposite orientation of a turbine casing for hooking the spacer thereto.

8. The turbine ring assembly according to claim 7, wherein the upstream and downstream hooks of the spacer are oriented downstream.

9. The turbine ring assembly according to claim 7, wherein the spacer comprises a downstream end comprising the downstream flange or flanges and which is cantilevered radially inwards in the direction of the longitudinal axis from the downstream hook of the spacer.

10. The turbine ring assembly according to claim 1, wherein the one or more downstream flange or of the spacer extend radially from a base of the downstream flange or flanges towards the plurality of ring angular sectors and the spacer comprises a part which extends axially from the base of the downstream flange or flanges to the upstream end of the spacer with a radial dimension which increases in the direction towards this upstream end, in such a way as to give this part of the spacer a generally triangular shape in axial cross-section.

11. The turbine ring assembly according to claim 10, wherein the spacer part of generally triangular shape comprises a plurality of successive segments arranged circumferentially adjacent to one another.

12. The turbine ring assembly according to claim 1, wherein the air diffuser comprises a wall arranged facing the angular sector and pierced by a plurality of through-holes for the passage of cooling air and for the distribution of a cooling air flow on the facing ring angular sector.

13. The turbine ring assembly according to claim 12, wherein the wall of the diffuser pierced by a plurality of through-holes is arranged at a distance sufficiently close to the facing ring angular sector, so as to minimise the temperature gradient over the facing angular sector.

14. The turbine ring assembly according to claim 1, wherein the air diffuser is arranged in an inner space which is delimited, on the one hand, by the spacer and, on the other hand, by each ring angular sector, the air diffuser having a general triangular shape suitable for being introduced into the inner space.

15. A turbomachine comprising the turbine ring assembly according to claim 1.

* * * * *